(12) United States Patent
Miyazaki

(10) Patent No.: US 11,255,368 B2
(45) Date of Patent: Feb. 22, 2022

(54) LOCK TIGHT BOLT-NUT

(71) Applicant: Tom T. Miyazaki, Hokuto (JP)

(72) Inventor: Tom T. Miyazaki, Hokuto (JP)

( * ) Notice: Subject to any disclaimer, the term of this patent is extended or adjusted under 35 U.S.C. 154(b) by 0 days.

(21) Appl. No.: 17/359,967

(22) Filed: Jun. 28, 2021

(65) Prior Publication Data
US 2021/0404508 A1  Dec. 30, 2021

(30) Foreign Application Priority Data

Jun. 29, 2020 (JP) .............................. JP2020-136506

(51) Int. Cl.
*F16B 39/282* (2006.01)

(52) U.S. Cl.
CPC .................................. *F16B 39/282* (2013.01)

(58) Field of Classification Search
CPC .......... F16B 31/02; F16B 31/04; F16B 37/00; F16B 39/28; F16B 39/282; Y10S 411/917
USPC .......................... 411/427, 432, 436, 929, 931
See application file for complete search history.

(56) References Cited

U.S. PATENT DOCUMENTS

| | | | | |
|---|---|---|---|---|
| 257,854 A * | 5/1882 | Dillon | ..................... | F16B 39/12 411/222 |
| 632,422 A * | 9/1899 | McLaughlin | .......... | F16B 39/36 411/237 |
| 876,081 A * | 1/1908 | Orr | ......................... | F16B 39/02 411/263 |
| 982,947 A * | 1/1911 | Greer | .................... | F16B 39/128 411/238 |
| 994,528 A * | 6/1911 | May | ........................ | F16B 39/16 411/244 |
| 1,473,321 A * | 11/1923 | Rumfelt | .................. | F16B 39/36 411/223 |
| 2,301,634 A * | 11/1942 | Nicholay | .............. | F16B 39/128 411/238 |
| 5,597,279 A * | 1/1997 | Thomas | .................. | B60B 3/145 411/432 |
| 5,865,581 A * | 2/1999 | Sadri | ..................... | F16B 31/021 411/5 |
| 6,062,791 A * | 5/2000 | Simon | ................... | F16B 5/0233 411/432 |
| 6,220,801 B1 * | 4/2001 | Lin | ......................... | F16B 31/02 411/278 |
| 2005/0025607 A1 * | 2/2005 | Guantonio | .............. | F16B 39/12 411/222 |

* cited by examiner

*Primary Examiner* — Roberta S Delisle

(57) ABSTRACT

A lock tight nut and bolt system resistant to loosening due to vibration. The lock tight nut and bolt system includes an upper nut that has a shank part. The upper nut has first threads that are off center from a center of a bolt. The upper nut is configured to receive the bolt. A lower nut has a socket part and second threads that are centered with the center of the bolt. The socket part corresponds with the shank park of the upper nut. The upper nut and the lower nut are concentric with the center of the bolt. The system further may include the bolt.

8 Claims, 4 Drawing Sheets

LOCK TIGHT BOLT-NUT

CROSS REFERENCES TO RELATED APPLICATIONS

This application claims priority to Japanese Patent Application JP2020-136506, filed Jun. 29, 2020, the entire contents of which is hereby incorporated by reference.

BACKGROUND

When installed, bolts and nuts are subject to vibrations. nuts tend to be moved up by vibration from all directions on the low angle slope of the bolt threads spiral. Overtime the vibration can cause the nuts to become loose and may compromise an installation. What is needed is a nut and bolt system that is not susceptible to loosing due to vibrations.

DETAILED DESCRIPTION

Figure 1:
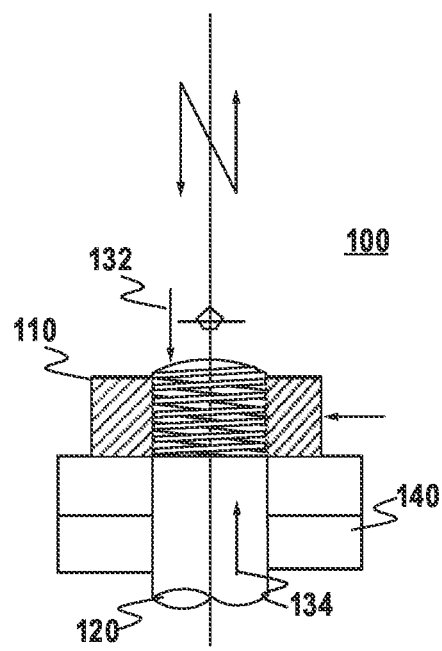
FIG. 1 is a rear diagram of a known nut and bolt.

A secured bolt-nut has a structure that tends to become loose under vibration. Nuts may be pushed up on the low angle slope of spiral threads of a bolt under vibration and start an unwinding rotation. Vibrations do not come always from horizontal direction. Various embodiments disclose a combination of nuts that secures the nuts to a bolt that are not subject to loosening due to vibrations from any direction.

In one embodiment, an upper nut has a low taper shank and a lower nut has a socket for self-holding and bolt holding in center. In various embodiments, the upper nut and the lower nut have the same taper for self-holding. Because of the same self-holding taper, they solidly fit together, holding Bolt in center firmly. When the upper nut tightened, the bolt is pulled up but stopped by lower nut and bolt head. Thus the two nuts and bolt become locked. In various embodiments, a standard bolt may be used without any modification.

In another embodiment, the upper nut has a very slightly off-centered thread center. When the upper nut tightens onto the bolt, the upper nut touches on the top of the bolt, then the shank and the socket guide bolt to the off-centered threads. When this happens, the bolt is forced to move towards its center, and the upper nut reacts to push back in the opposite direction. This force exerts on the spiral contact zone for bolt-nut lock tightening.

In various disclosed embodiments, loosening of nuts on a bolt due to vibration is reduced or even eliminated based on increasing the spiral contact area. The increased spiral contact area allows more pressure to be exerted so that threads to threads are tightly engaged to prevent sliding between them. In various embodiments, upper and lower nuts together with a bolt are locked through shank and socket to cope with vibration.

Various embodiments allows nuts to be tightened onto a bolt to enlarge the spiral contact area and let the two threads engaged to protect equipment, machinery and structures where bolt-nut are used, from damages and vibration.

In various embodiments an upper nut has a shank and a lower nut has a socket. After the lower nut tightens to the bolt to hold components, the upper nut is tightened onto the bolt. The shank and the socket are self-holding. When secured the upper nut pulls the bolt upward and the lower nut and the bolt head pull down. Based in part of these opposite forces, the two nuts and the bolt become solid and hold together. When secured the nuts are protected from horizontal and vertical vibration. In various embodiments, the upper nut has slightly off-centered threads from the bolt center. When the upper nut tightens down on the bolt, the bolt moves up on to the off-centered thread but is pushed sideway and upper nut reacts to push back. This is where the spiral contact area is compressed from bolt and nut to prevent the nut's sliding on the low angle slope of the bolt to minimize the effect of vibration The total force on the spiral contact area may be calculated as bolt diameter×nut height (mm2)× Pressure (g/mm2). The total force on the spiral contact area may become a substantial force between bolt and nut for tight locking.

Various disclosed embodiments provide improved tight locking between the nuts and the bolt. In various embodiments, precision threads machining is used to minimize the clearance between the threads of the bolt-nut, such that when assembled there is increased the spiral contact area and threads engagement, Based on the increased spiral contact area and thread engagement increase tight locking capabilities is achieved.

Bolt-nut are one of the most simple mechanical elements and are used on practically every equipment, machines, automobiles, ships, railroads, bridges and aircrafts all over the world. They are used wherever necessary to assemble, overhaul, and reassemble. To ensure correct installation though they should not fail or become loose in service. If they become loose in service, they can cause malfunction, lower efficiency and potentially cause an accident to affect human life and enterprise. Millions of bolt-nuts are manufactured and used on every machinery, automobiles, railroad equipment, ships and bridges and aircrafts over the world. The ability to create a bolt-nut that is less susceptible to loosening due to vibration, therefore, would be of great value.

Figure 2:
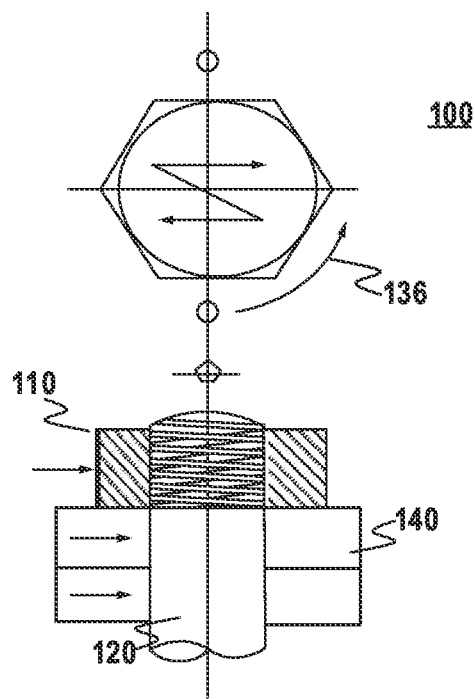
FIG. 2 is a front diagram of a known nut and bolt.

FIG. 1 is a rear diagram of a known nut and bolt 100. FIG. 2 is a front diagram of a known nut and bolt 100. A nut 110 may attach to a bolt 120 via corresponding threads on the nut 110 and the bolt 120. When installed, the nut 110 provides a force 132 that secures the bolt-nut on a surface 140. The bolt 120 and the surface 140 provide a reciprocal force 134 that keeps the bolt-nut in place. The nut 110 may be secured to the bolt 120 via a torque force 136. Once installed, bolt-nuts are commonly subject to vibration from all directions. When vibrated, the nut 110 may move up on the low angle slope bolt thread spiral of the bolt 120. When this occurs the nut 110 is loosened and separates from the surface 140. If vibrations continue, the nut 110 may continue up the threads of the bolt 120 until the nut 110 completely disengages with the bolt 120.

Figure 3:
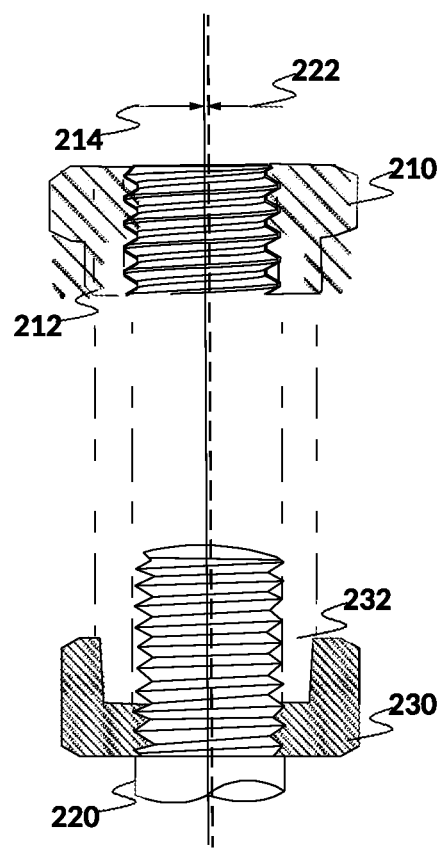
FIG. 3 is a diagram of a lock tight bolt nut in an unsecured position in accordance with respective examples.

FIG. 3 is a diagram of a lock tight bolt nut in an unsecured position in accordance with respective examples. Various embodiments include an upper nut 210 with a shank portion 212. A lower nut 230 includes a socket part 232. The lower nut 230 may be secured onto a bolt 220. The bolt 220 has a centerline 222. In various embodiments, the centerline 222 of the bolt 220 is at the center of the bolt 220. In various embodiments, the threads of the bolt 220 are aligned around the centerline 222.

The lower nut 230 has threads corresponding with the threads of the bolt 220. Threading the lower nut 230 onto the bolt 220 secures the lower nut 230 onto the bolt 220. In various embodiments, the centerline of the threads of the lower nut 230 is the same as centerline of the bolt 220. The upper nut 210 also has threads that are used to secure the upper nut 210 to the bolt 220. In various embodiments, the upper nut 210 has a centerline 214 that is slightly off center when compared to the centerline 222 of the bolt 220. For example, being slightly off center may be based on the diameter of the bolt. In some embodiments, the centerline 214 is off center by a small fraction of the diameter of the bolt 220. For example, the centerline 214 may be off center by 1/1000, 1/100, 1/50, etc.

To account for vibrations, various embodiments after the lower nut 230 is tightened on to the bolt 220 for assembling machine components, the upper nut 210 may be tightened on the bolt 220 and the lower nut 230. When secured by turning the upper nut 210 on the bolt 220, the shank part 212 is firmly seated in the socket part 232. The upper nut 210 and the lower nut 230 may firmly stay in place due to the small taper, holding the bolt 220 in center. The taper is based on when the upper nut 210 is tightened; the bolt 220 is pulled upwards. This taper may also result in pushing the upper nut 210 sideways, putting pressure on the bolt 220 and the lower nut 230. The lower nut 230 and the bolt head hold the bolt 220 in place. Thus, the bolt 220 is under tensile stress and does not move. When secured, the two nuts and the bolt are tightly held in place even under vibration.

In various embodiments, the shank part 212 and the socket part 232 are concentric with bolt center line. Driving the shank part 212 into the socket part 232 may force the bolt 220 to go up the spiral of the off-centered threads of the upper nut 210. When this happens, the bolt 220 is pushed towards its bolt center line 90 degree and the upper nut 210 reacts to push back. The spiral contact zone between the bolt-nut is tightly pressed and prevents sliding. The spiral contact area may be calculated as bolt diameter×the upper nut's length (mm2)×pressure g/mm2. In various embodiments, this force becomes a substantial force to exert which secures the bolt-nut.

Figure 4:
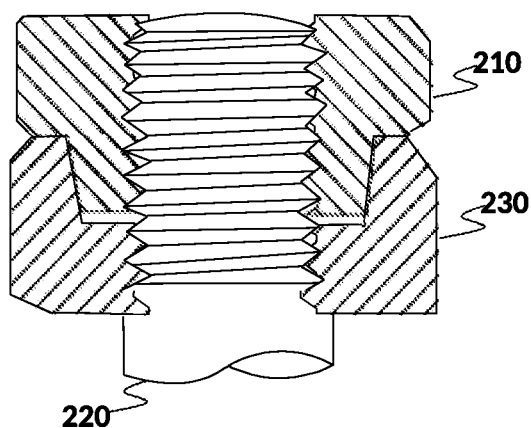
FIG. 4 is a diagram of a lock tight bolt nut in a secured position in accordance with respective examples.
Figure 5:
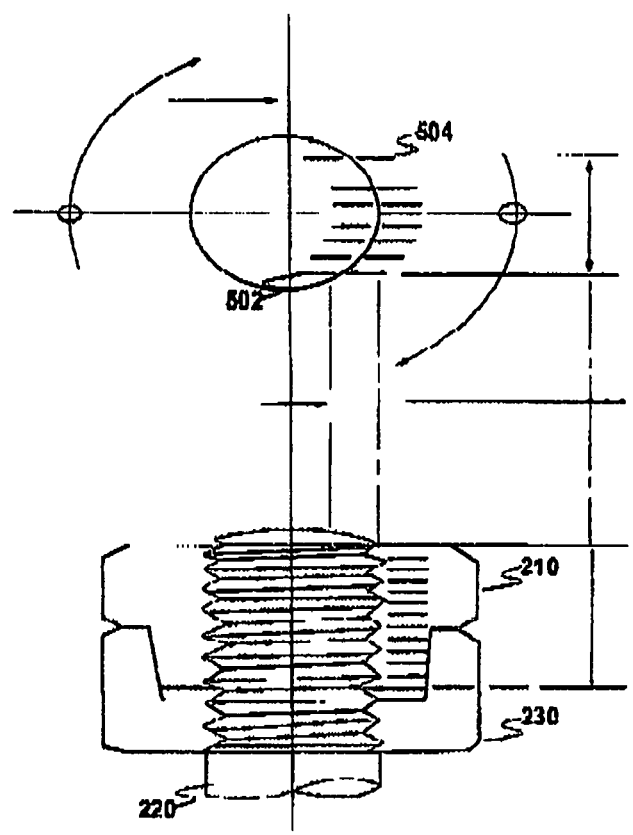
FIG. 5 is a diagram of a lock tight bolt nut in a secured position illustrating spiral contact areas in accordance with respective examples.
Figure 6:
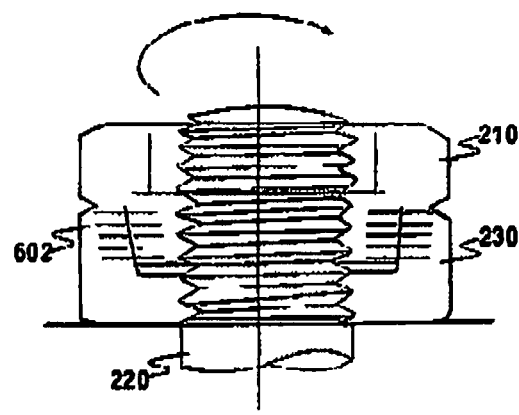
FIG. 6 is a diagram of a lock tight bolt nut in a secured position illustrating spiral contact areas in accordance with respective examples.
Figure 7:
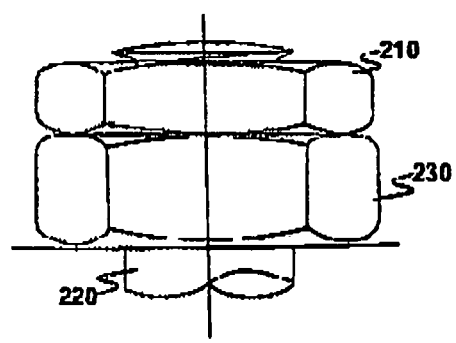
FIG. 7 is a diagram of a lock tight bolt nut in a secured position in accordance with respective examples.

FIG. 4 is a diagram of a lock tight bolt nut in a secured position in accordance with respective examples. FIG. 5 is a diagram of a lock tight bolt nut in a secured position illustrating spiral contact areas in accordance with respective examples. Forces 504 from the bolt 220 being forced off center are shown. Corresponding forces 502 from the upper nut are also shown. The forces cause the spiral contact area to be under pressure, which secures the nut-bolt. In some embodiments, the taper of the socket of the lower nut and the corresponding taper of the shank of the upper nut is reduced to be as small as possible. In some embodiments, there is no taper, e.g., the socket and shank have corresponding 90 degree angles. In other embodiments, the angle of the taper may be 1 degree, 3 degrees, 5 degrees, etc. FIG. 6 is a diagram of a lock tight bolt nut in a secured position illustrating spiral contact areas in accordance with respective examples. Forces 602 between the upper nut and the lower nut are shown cause by the bolt being pulled off its center. FIG. 7 is a diagram of a lock tight bolt nut in a secured position in accordance with respective examples.

In various embodiments, a system to secure a bolt and nut to an object includes an upper nut that has a shank part. The upper nut may also have threads off center from a center of a bolt. The threads of the upper nut, while being off center, are able to receive the bolt and secure the upper nut to the bolt. A lower nut has a socket part and second threads that are centered with the center of the bolt. The socket part corresponds with the shank park of the upper nut. The upper nut and the lower nut are concentric with the center of the bolt. The bolt may be used to first receive the lower nut. Then the upper nut may be secured to the bolt. When the upper nut is screwed onto the bolt, the upper nut is configured to pull the bolt up towards the upper nut. In some embodiments, the bolt engages the first off center threads of the upper nut when torque is applied to the upper nut. In some embodiments, the shank part of the upper nut is configured to engage the socket part of the lower nut. In some embodiments, when secured spiral contact of the first threads prevents upper nut and lower nut movement. In some embodiments, the bolt is held under tensile stress based on an upwards force of the upper nut and a lower force of the lower nut.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system comprising:
   an upper nut having a shank part, the upper nut having first threads off center from a center of a bolt, wherein the upper nut is configured to receive the bolt;
   a lower nut having a socket part, the lower nut having second threads that are centered with the center of the bolt, wherein the socket part corresponds with the shank part of the upper nut, wherein the upper nut and the lower nut are concentric with the center of the bolt; and
   the bolt, wherein the upper nut is configured to pull the bolt up towards the upper nut, and wherein the bolt engages the first off center threads of the upper nut when torque is applied to the upper nut.

2. The system of claim 1, wherein the shank part of the upper nut is configured to engage the socket part of the lower nut.

3. The system of claim 2, wherein spiral contact of the first threads prevents upper nut and lower nut movement.

4. The system of claim 2, wherein the bolt is held under tensile stress based on an upwards force of the upper nut and a lower force of the lower nut.

5. A lock tight nut and bolt comprising:
   an upper nut having a shank part, the upper nut having first threads off center from a center of a bolt, wherein the upper nut is configured to receive the bolt;
   a lower nut having a socket part, the lower nut having second threads that are centered with the center of the bolt, wherein the socket part corresponds with the shank part of the upper nut, wherein the upper nut and the lower nut are concentric with the center of the bolt; and the bolt, wherein the upper nut is configured to pull the bolt up towards the upper nut, and wherein the bolt engages the first off center threads of the upper nut when torque is applied to the upper nut.

6. The lock tight nut and bolt of claim 5, wherein the shank part of the upper nut is configured to engage the socket part of the lower nut.

7. The lock tight nut and bolt of claim 6, wherein spiral contact of the first threads prevents upper nut and lower nut movement.

8. The lock tight nut and bolt of claim 6, wherein the bolt is held under tensile stress based on an upwards force of the upper nut and a lower force of the lower nut.

* * * * *